Figure 1:
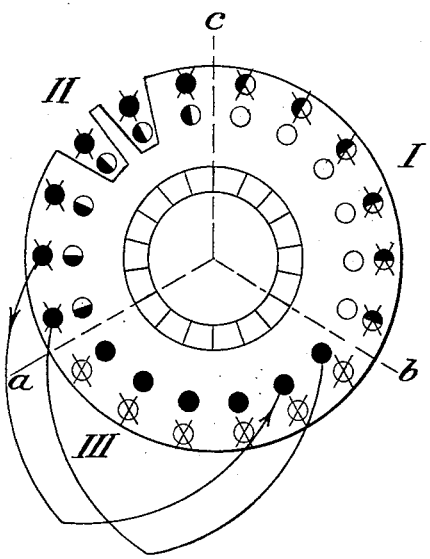

A. L. J. SCHERBIUS.
DYNAMO ELECTRIC MACHINERY.
APPLICATION FILED SEPT. 7, 1906.

1,084,040.

Patented Jan. 13, 1914.

- Phase I
○ " II
◐ " III

Witnesses:
Ewd L. Tolson
C. E. Parsons

Inventor:
Arthur L. J. Scherbius,
by Spear, Middleton, Donaldson & Spear
Attys.

UNITED STATES PATENT OFFICE.

ARTHUR LUDOLF JAKOB SCHERBIUS, OF FRANKFORT-ON-THE-MAIN, GERMANY, ASSIGNOR TO GENERAL ELECTRIC COMPANY, A CORPORATION OF NEW YORK.

DYNAMO-ELECTRIC MACHINERY.

1,084,040.  Specification of Letters Patent.  Patented Jan. 13, 1914.

Application filed September 7, 1906. Serial No. 333,735.

*To all whom it may concern:*

Be it known that I, ARTHUR L. J. SCHERBIUS, subject of the Emperor of Germany, residing at Frankfort-on-the-Main, Germany, have invented new and useful Improvements in Dynamo-Electric Machinery, of which the following is a specification.

It is known in direct current machines to apply special windings on the stator for compensating the armature reaction. In the case of polyphase commutator dynamos, additional difficulties are encountered. Since the field of such a machine is supplied with alternating current, a pulsating flux is produced. The rapid introduction and withdrawal of this flux in those coils which are short-circuited by the brushes gives rise to such heavy currents in these coils that commutation becomes doubly difficult. This action is similar to that in a transformer with a short circuited secondary and is commonly known as the transformer action. These difficulties may be overcome and the armature reaction neutralized the same as in direct current dynamos by the use of proper compensating windings wound on the stator. The application of such compensating windings results in distinct advantages; moreover, such machines become practically useful only when provided with such windings. These advantages are: 1. Neutralizing the armature reaction. 2. Giving a good commutation by creating a commutating field. 3. Making the speed independent of the frequency, so that, as in the case of direct current machines, it is proportional to the terminal voltage and inversely proportional to the intensity of the exciting field.

The object of the present invention is to provide a compensating winding for triphase commutator machines wherein the rotor has a drum winding with a coil pitch of 120 electrical degrees, instead of 180° as in normal D. C. armatures. The result of this shortened coil pitch is, that there are only three commutation zones in the rotor and correspondingly only three interpole zones in the stator.

In the following the section of the stator between two adjacent commutation zones is called a "pole." In the stator iron there are provided holes or slots, in which the compensating winding is fixed. The compensating winding itself is traversed by the brush current. According to this invention the phases are combined on each pole in the hereinafter described manner in such a way that the intensity of the magneto motive force in the stator is exactly equal and opposite to that in the rotor at any point of the circumference and at any moment.

Figure 2:
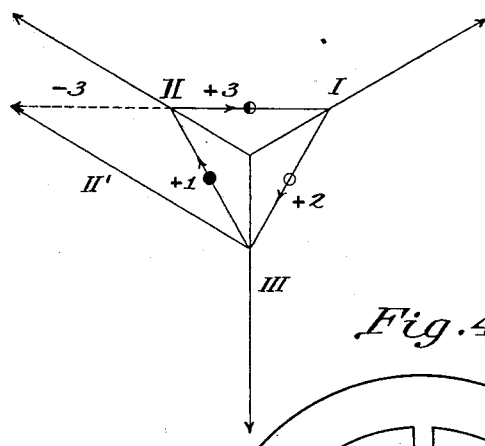
Figure 3:
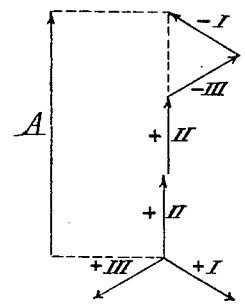

In order that my invention may be more clearly understood, reference is had to the accompanying sheet of drawings, in which, Figure 1 is a diagrammatic view to illustrate the distribution of the phases in the rotor currents with such shortened coil pitch; Figs. 2 and 3 are diagrammatic views showing the relation of the phases, and Fig. 4 is a diagrammatic view of a three-phase commutator machine provided with a compensating winding in accordance with my invention.

The distribution of the phases in the rotor with the shortened coil pitch is shown in Fig. 1 from which it will be seen that the upper and lower bars at each point of the rotor carry a current of different phase. This gives three commutation zones marked $a, b, c$. Between any two of these zones the resulting phase of the upper and lower bar is constant, the three sections are indicated by the numbers I, II, III. To illustrate what phase this resulting phase of the upper and lower bar has, compared with the brush current by which the ampere turns of the rotor are to be neutralized by the compensating winding, reference is made to Fig. 2. The rotor is connected in $\triangle$ and the three currents of the rotor are diagrammatically shown in the triangle 1, 2, 3. The brush currents are the star currents and are indicated by the vectors I, II, III. The bars of rotor section II between the commutation zones $a$ and $c$ in Fig. 1 carry the two rotor currents 1 and 3. The upper bars, which carry the rotor current 1 are marked with a cross to indicate that their current flows in the opposite direction from that in the lower bars, which is evident. To find the resulting phase of the currents in section II the vectors of the rotor currents $+1$ and $-3$ shown in Fig. 2 must be combined, and the phase of the resultant II' will be seen to be the same as that of the brush current II. It will be apparent that a proper compensating winding would be secured if a winding carrying this brush current II was wound as ring winding around the stator opposite the section II of the rotor. But a ring winding has great objections regarding construction. The difficulty which occurs when it is attempted to wind this compensating winding as a drum winding in any of the forms heretofore employed in connection with dynamo electric machines is apparent. In such a drum winding conductor bars under different poles are so connected that current flowing in one direction through a conductor under one pole finds its return path through a corresponding conductor located under another pole. If, therefore, the brush current II is caused to flow in the same direction through the conductors of such a winding opposite the section II there must obviously be some place for the return conductors which, if placed in one of the other sections, will bring this section out of the proper phase, since for each section only bars of its own brush current are suitable. The problem is solved by this invention. For each section conductor, bars carrying all three brush currents are used and by a combination of four bars, two of which are traversed by their own brush current and one by each of the other brush currents, the right phase is obtained as shown in Fig. 3. Here the short vectors represent that combination of currents found in any four adjacent conductors of section II of the stator. It will be noted that in four adjacent bars in this section we have two conductors carrying brush current II, one carrying brush current I and another carrying brush current III, the latter two currents being in opposite direction to that of the first two. The vector A represents the phase of the resultant which it will be seen, is like that of brush current II. We will therefore get proper compensation for section II of the rotor whose currents, as shown in Fig. 2, give a resultant II' in phase with the brush current II. One manner in which these bars can be connected up is shown in Fig. 4. In this figure the bars of the first phase are indicated by black circles, those of the second phase by empty circles and those of the third phase by half empty circles. In order not to render this figure obscure the connections of only one single phase are shown. The other phases are connected similarly. It will be seen from this figure that the brush current first of all is conducted around an auxiliary or interpole, then passes alternately through the six bars of a main pole and three bars of each of the two other main poles, whereupon the current is conducted around the next following auxiliary pole and then leaves the machine. In the case of more or less than 12 compensating bars per pole the current is conducted in a corresponding manner. By conducting the brush currents around the two neighboring auxiliary poles the commutation field is created. In said Fig. 4 the coil short circuited by the brush of the phase I is represented at 4, in the rotor together with the appertaining armature slots; all the other armature slots and commutator segments being omitted for the sake of clearness. For the excitation of the main and interpoles any known kind of winding may be used, an example for the excitation of a main pole being indicated at 5.

From the figure the principle of the winding may be seen to be as follows: On each stator pole there are arranged bars carrying current of all three phases so that there are twice as many bars carrying current of one phase as of each of the two other phases. Furthermore it will be seen that of every four adjacent bars, which in the diagram form the corners of a quadrangle (designated 6) two carry current of the same phase while the two other bars carry currents of the two other phases. By this arrangement it results that the compensation of the armature reaction is correct at each point of the periphery. Since, therefore, by the use of such a compensating winding, the transformer action has been exactly neutralized, it will be evident that the motor speed will be dependent only upon the impressed voltage and the field strength and will be independent of the frequency.

Figure 4:
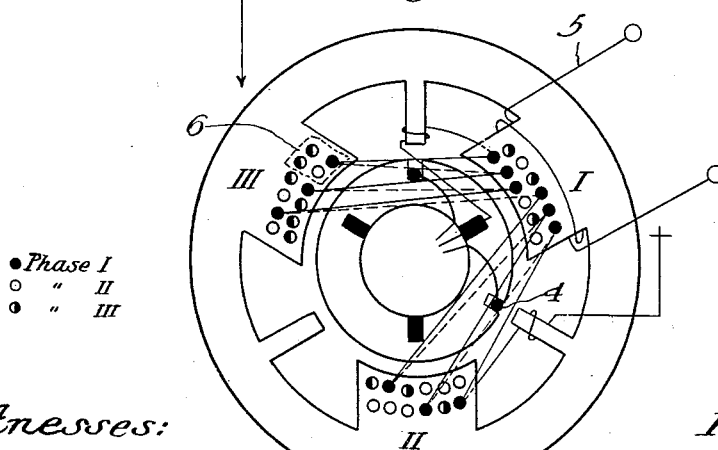

In Fig. 4 an example of the lowest number of poles is given. In the case of a greater number of poles the compensating winding would be arranged accordingly.

What I claim is:—

1. In a three-phase commutator machine, a drum wound rotor with a coil pitch of 120°, a drum compensating winding on the stator having connections to receive the three brush currents, each section between two adjacent commutation zones having bars of all three phases.

2. In a three phase commutator machine, a drum wound rotor with a coil pitch of 120°, a drum compensating winding on the stator having connections to receive the three brush currents, each section between two adjacent commutation zones having bars of all three phases with twice as many bars of one phase as of each of the two other phases.

3. In a three phase commutator machine, a drum wound rotor with a coil pitch of 120°, a drum compensating winding on the stator having connections to receive the three-brush currents, each section between two adjacent commutation zones having bars of all three phases with twice as many bars of one phase as of each of the two other phases, the bars of the three phases being regularly distributed so that of every four adjacent bars two are of one phase and the other two of the two other phases.

4. In a three-phase commutator machine, a drum wound rotor with a coil pitch of 120°, a drum compensating winding having connections to receive the three brush currents and auxiliary poles having windings
5 which receive the currents of their respective adjacent two brushes.

In testimony whereof I have signed my name to this specification in the presence of two subscribing witnesses.

ARTHUR LUDOLF JAKOB SCHERBIUS.

Witnesses:
KARL SCHNETZLER,
GEO. C. LEBER.

Copies of this patent may be obtained for five cents each, by addressing the "Commissioner of Patents, Washington, D. C."